United States Patent
Aoyagi (12)

(10) Patent No.: US 6,535,508 B1
(45) Date of Patent: Mar. 18, 2003

(54) MULTIPLE CONNECTION METHOD AND DEVICE FOR SUBSCRIBER ACCESS NETWORK

(75) Inventor: Masato Aoyagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/151,522

(22) Filed: Sep. 11, 1998

(30) Foreign Application Priority Data

Sep. 25, 1997 (JP) .............................. 9-260255

(51) Int. Cl.[7] .......................... H04L 12/50; H04L 12/56
(52) U.S. Cl. ..................... 370/376; 370/465; 370/522; 379/221.02
(58) Field of Search ................. 370/375–379, 370/419–421, 437–438, 522, 465, 400–408; 379/219–220, 226–227, 229–230, 333–335, 93.16, 221.02, 142.01

(56) References Cited

U.S. PATENT DOCUMENTS 5,381,405 A * 1/1995 Daugherty .................. 370/376
5,781,623 A * 7/1998 Khakzar ..................... 370/437
5,910,980 A * 6/1999 Ogasawara et al. ..... 379/142.01
6,324,384 B1 * 11/2001 Nobuyasu et al. ......... 455/74.1
6,381,327 B1 * 4/2002 Loebig .................. 379/221.02

FOREIGN PATENT DOCUMENTS

| EP | 0792079 | * 8/1997 | ........... H04Q/11/04 |
| JP | 6-311226 | 11/1994 | |
| WO | WO 97/16936 | * 5/1997 | ............ H04Q/7/24 |
| WO | WO 97/35443 | * 9/1997 | ............ H04Q/3/00 |

* cited by examiner

Primary Examiner—Even Nguyen
(74) Attorney, Agent, or Firm—Whitham, Curtis & Christofferson, PC

(57) ABSTRACT

Multiple connections of subscriber access systems are controlled by means of V5 interfaces in a switched system accommodating interface prescribed by V5 protocol according to ETSI standards by using one B-channel as communication channel C2 with an access network that accommodates subscribers of another network service provider apart from communication channel C1 prescribed by normal V5 protocol between the local exchange and an access network operated by the service provider of the local exchange when connecting access networks accommodating subscribers of another network service providers to an access network operated by the service provider of the local exchange.

5 Claims, 5 Drawing Sheets

MULTIPLE CONNECTION METHOD AND DEVICE FOR SUBSCRIBER ACCESS NETWORK

BACKGROUND OF THE INVENTION

1. Field of the Invention

The present invention relates to a switched system that accommodates a V5 interface (European Telecommunications Standards ETS300-324, ETS300-347), and in particular, to a multiple method and device for a subscriber access network for a case in which a subscriber of an access network of a particular service provider cannot be directly accommodated in the access network of another service provider that operates the local exchange.

2. Description of the Related Art

FIG. 1 is a conceptual representation of the architecture of a multiple connection for subscriber access network used in the prior art. In this system, which is disclosed in Japanese Patent Laid-open No. 311226/94, when distant terminal 111 is connected to remote terminal 105, the information that connection has occurred is reported to remote terminal 105. Upon receiving the information that connection has occurred, remote terminal 105 makes an entry in a terminal table of distant terminal 111 within remote terminal 105, and based on this information, the cross-connections of circuit channel 110 and subscriber 115 are effected by transmitting on a fixed channel within the circuit channel, thereby realizing a system that allows line concentration of subscriber access network devices connected by multiple connection.

However, the above-described prior art has the following problems:

First, remote terminals in the prior art have both local exchange functions as well as access network functions.

The reason for this is that inclusion of local exchange functions and access network functions means that the V5 protocol functions must also include both local exchange and access network functions, resulting in an extremely large system. In addition, since channel control of the distant terminal is effected by remote terminals, concerns for serviceability dictate control by means of software close to the central office. These factors combine to result in very costly remote terminals.

The second problem is that, in the prior art, the central office and the distant terminal cannot directly exchange messages on a communication channel.

The reason for this is that communication cannot be effected with the distant terminal from the central office by V5 protocol because the communication channel with the distant terminal are terminated at a remote terminal. Processing must therefore be carried out at remote terminals when connecting for every call, and the connection process consequently becomes time consuming.

The third problem is that in the prior art, V5 protocol must be established even between the distant terminal and remote terminals when realizing a V5 interface.

The reason for this is that the subscriber number of a subscriber that is included in the distant terminal is not known at the central office, thereby necessitating a correspondence table for the subscriber number and the employed channel of the line between the distant terminal and remote terminals. This necessity not only makes processing at the central office burdensome and costly, but also prevents the independent establishment and dynamic connection of both channels on the line between a remote terminal and the distant terminal and channels on the line between the central office and remote terminals for every call.

SUMMARY OF THE INVENTION

In view of the above-described problems of the prior art, the object of the present invention is to effect control by means of a V5 interface without providing local exchange functions to the access network operated by the service provider of the local exchange when connecting an access network that accommodates subscribers of another network service provider in a multiple connection for a subscriber access network, thereby allowing a reduction in cost, an improvement in serviceability through centralized control, sharing of interfaces by means of V5 interfaces, and dynamic assignment of channels on each line independently for every call.

To realize the above-described objects, the present invention provides a multiple connection method for a subscriber access network that, when connecting an access network that accommodates subscribers of another network service provider to the access network operated by the service provider of the local exchange in a switched system that includes interfaces prescribed by V5 protocol according to standards of the ETSI (European Telecommunications Standards Institute); effects control by V5 interfaces without providing local exchange functions to the access network operated by the service provider of the local exchange.

In addition, as a multiple connection device for a subscriber access network that connects a downstream-link access network accommodating subscribers of another network service provider to an upstream-link access network that is operated by the service provider of the local exchange, the present invention is made up from:

a local exchange that includes: a time switch for concentrating subsidiary lines; LAP (Link Access Procedure) V5 for terminating communication channels prescribed by V5 protocol that connect with access network that are accommodated at lower ranks; another LAP V5 that is disposed for terminating communication channels prescribed by V5 protocol that connect with access networks of another network service providers located at still lower ranks; a dropper/inserter that drops a control channel of V5 protocol to said LAP V5 or inserts a massage from LAP V5 to an appropriate channel; and a CPU that controls V5 protocol, channel assignment on lines, and line concentration;

an upstream-link access network that includes: a time switch that connects channels of lines with said local exchange to channels of lines with lower-ranking access networks; a dropper/inserter that drops or inserts V5 protocol communication messages with a local exchange; LAP V5, which is a V5 protocol terminating device; and a CPU that directs connections of V5 protocol, higher-ranking, and lower-ranking channels; and a downstream-link access network that includes: a dropper/inserter that drops or inserts V5 protocol communication messages with said local exchange; a time switch that switches connections between line channels and accommodated subscribers; a subscriber circuit having an interface function with accommodated subscribers; LAP V5, which is a V5 protocol terminating device; and a CPU that controls V5 protocol and administers connections of line channels with subscribers.

The present invention allows simplification of a system by not providing upstream-link access networks with the functions of both an access network and a local exchange. In addition, an access network that accommodates subscribers communicates directly with the local exchange by a V5 interface without undergoing intermediation at upstream-link access networks, thereby allowing a reduction in the connection processing time for a call, and in addition, allowing the local exchange to directly recognize the subscriber numbers of a subscriber accommodated in a downstream-link access network. The present invention therefore reduces the call connection time, lowers costs, and eases handling of subscriber numbers.

The above and another objects, features, and advantages of the present invention will become apparent from the following description with reference to the accompanying drawings which illustrate examples of the present invention.

DETAILED DESCRIPTION OF THE PREFERRED EMBODIMENTS

Figure 1:
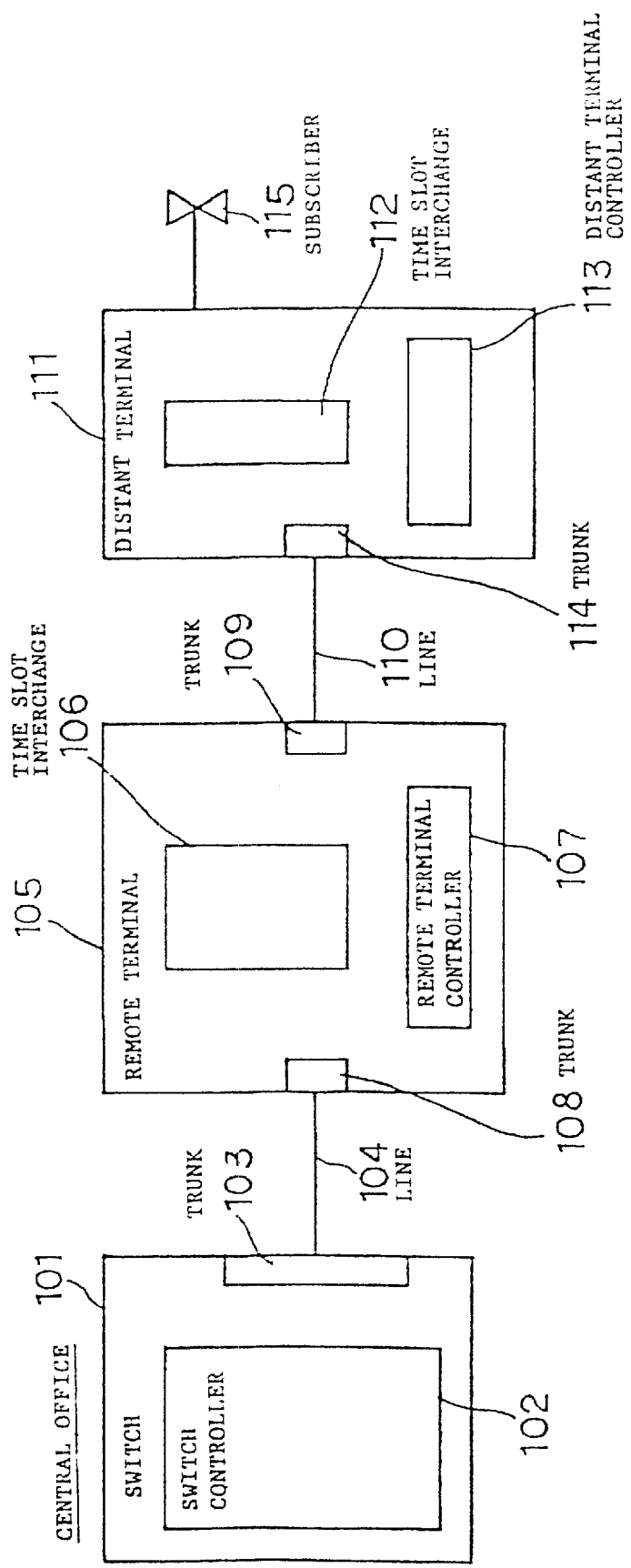
FIG. 1 is a block diagram showing the construction of a multiple connection system for a subscriber access network of the prior art.
Figure 2:
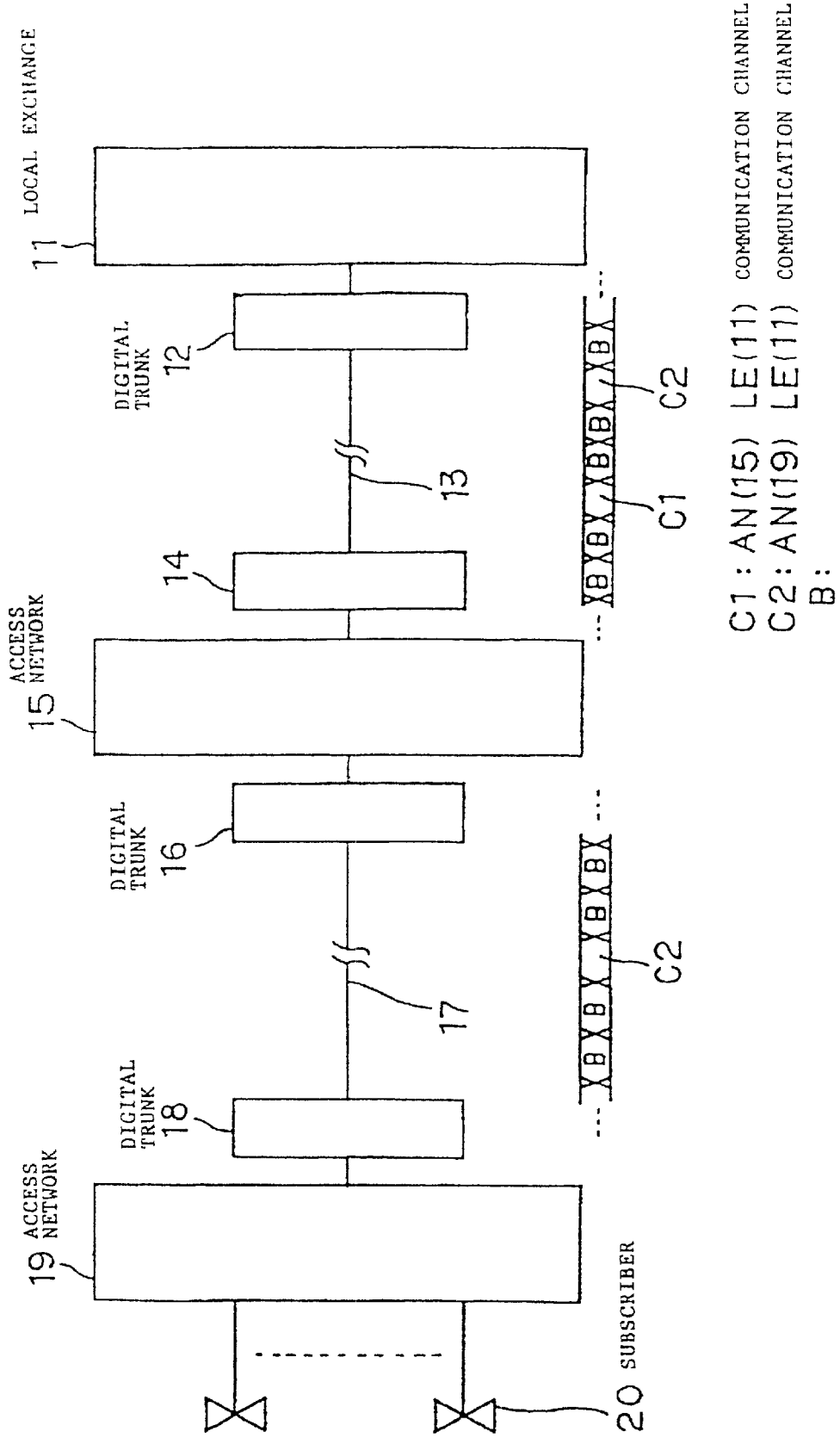
FIG. 2 is a conceptual view of the construction of a multiple connection system for a subscriber access network according to an embodiment.

An embodiment of the present invention is next described with reference to the accompanying figures. In FIG. 2, line 13 and line 17 are each digital lines and communicate by means of digital trunks 12, 14, 16, and 18. These lines 13 and 17 establish V5 interfaces through the performance of V5 protocol communication with local exchange 11 by their respective access networks 15 and 19.

In a V5 interface, a fixed channel is held for message communication between a local exchange and access networks. In the case of multiple connection for subscriber access network, communication channels of another service providers are assigned on line 13 by apart from communication channels for access networks of the same service provider. These channels are individually dropped to a terminating device by dropper/inserter 36 (refer to FIG. 5) of the local exchange, the terminating device being LAP (Link Access Procedure) V5 (37) in the case of upstream-link access network 15 and LAP V5 (38) in the case of downstream-link access network 19 operated by another service provider. Upstream-link access network 15 drops communication messages from local exchange 11 only from its own communication channel. Communication messages for downstream-link access network 19 are sent to downstream-link access network 19 without being terminated at upstream-link access network 15 by fixedly connecting the communication channel for communication messages to fixed channels of line 17 by time switch 31, thereby enabling control of a multiple connected access network at one local exchange by V5 interfaces.

Figure 3:
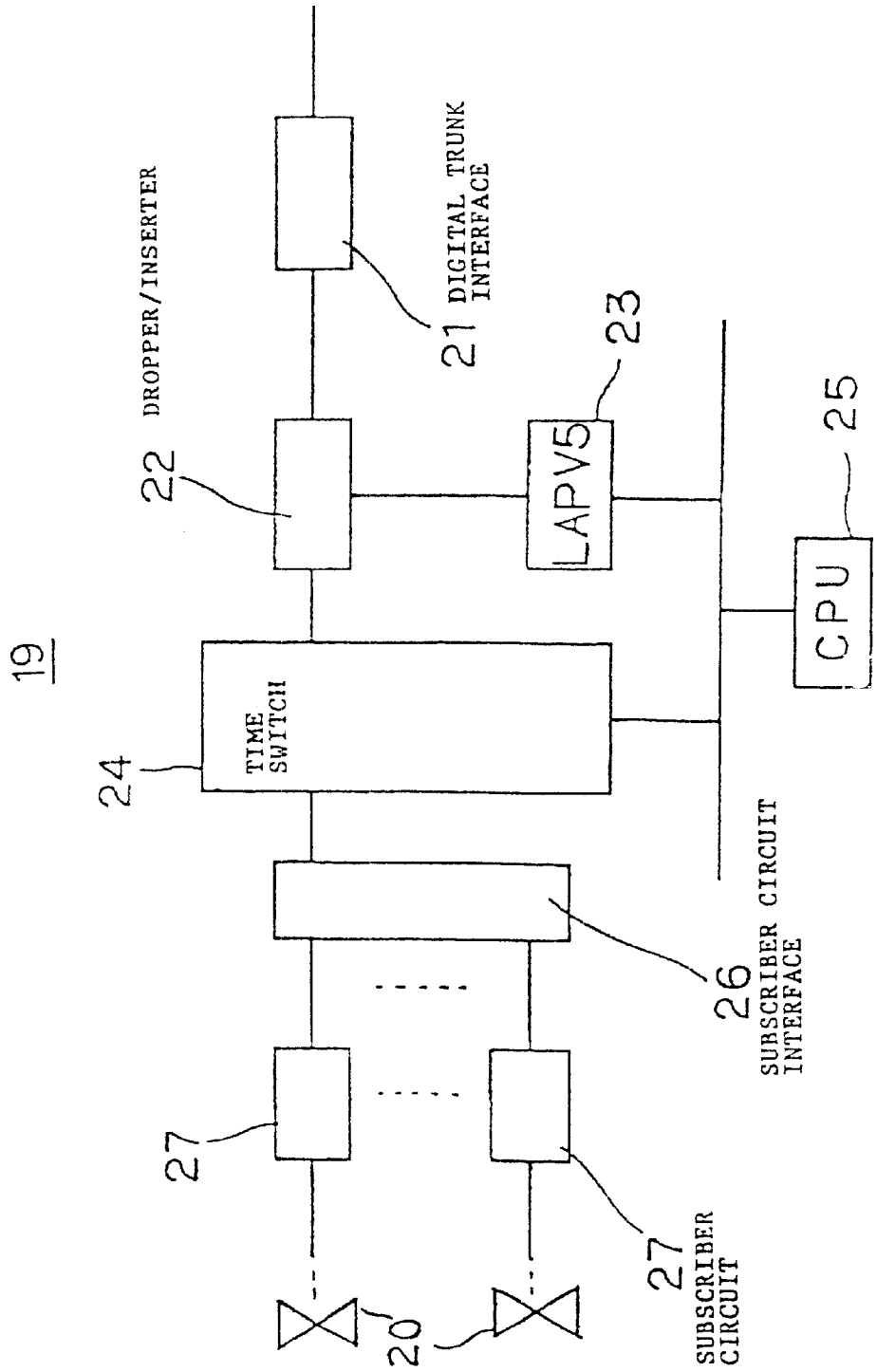
FIG. 3 is a block diagram showing the construction of a downstream-link access network that accommodates subscribers.

Detailed explanation is next presented regarding each construction of this embodiment, beginning with a downstream-link access network. FIG. 3 shows the configuration of downstream-link access network 19 shown in FIG. 2.

In FIG. 3, a V5 communication channel from line 17 is dropped by dropper/inserter 22 and sent to LAP V5 (23). V5 protocol is terminated at LAP V5 (23), V5 protocol is analyzed by CPU 25 to control time switch 24, and a speech channel of subscriber 20 (refer to FIG. 2) is dynamically connected to channels on line 17 for each call. Subscriber circuit 27 controls subscriber 20, and subscriber circuit interface 26 is the interface for sending the speech signals from subscriber circuit 27 to time switch 24.

Figure 4:
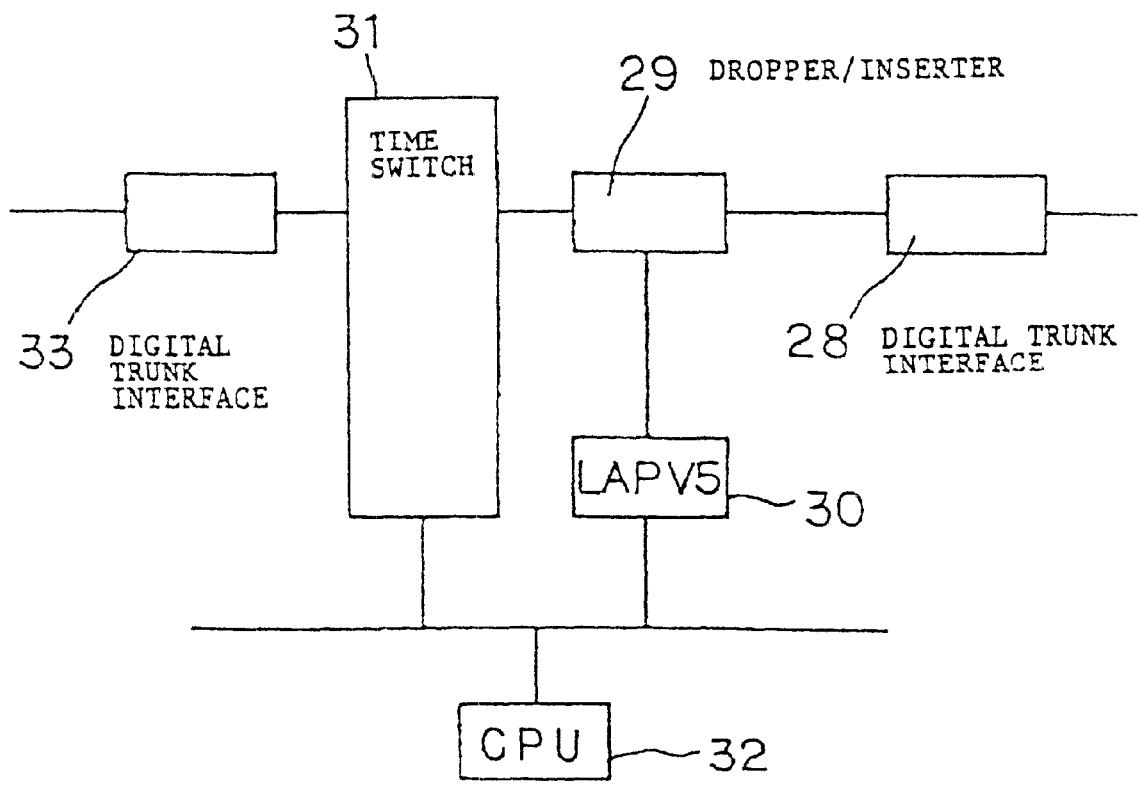
FIG. 4 is a block diagram showing the construction of an upstream-link access network.

Explanation is next presented regarding the upstream-link access network. FIG. 4 shows the configuration of upstream-link access network 15 shown in FIG. 2.

In FIG. 4, communication channel C1 with local exchange 11 is dropped by dropper/inserter 29 based on signals sent from digital trunk interface 28, which constitutes the interface between local exchange 11 and line 13. The dropped communication channel C1 is sent to LAP V5 (30), and LAP V5 (30) terminates the V5 protocol. CPU 32 analyzes the V5 protocol, controls time switch 31, and switches the channel connections of lines 13 and 17 for each call. Digital trunk interface 33 carries out the interface with line 17.

Figure 5:
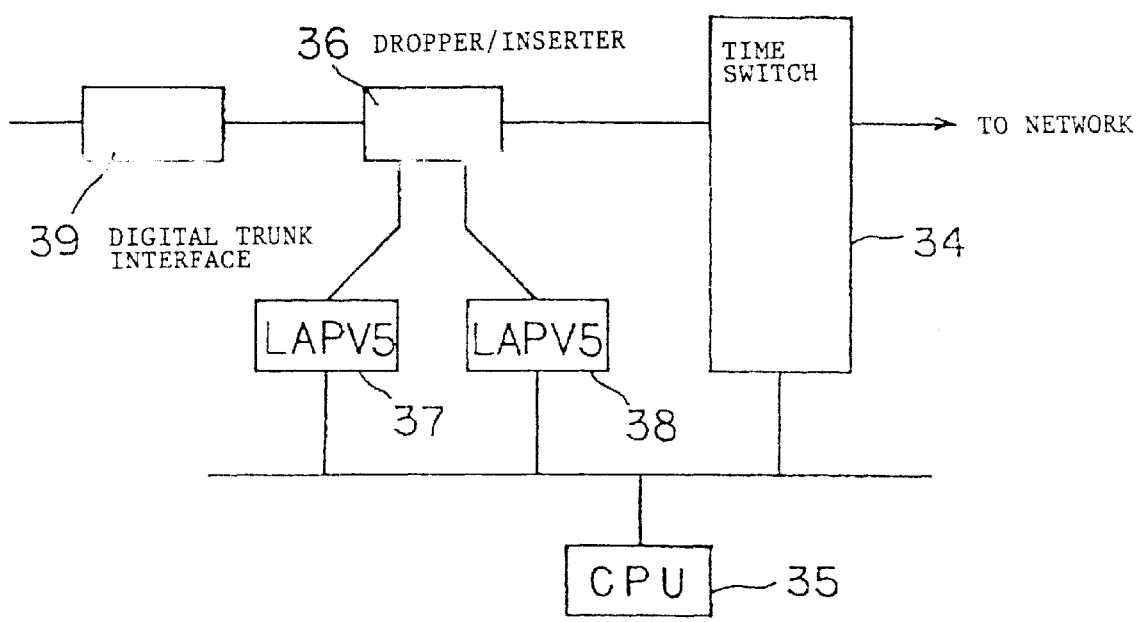
FIG. 5 is a block diagram showing the construction of a local exchange.

Explanation is next presented regarding the local exchange. FIG. 5 shows the configuration of local exchange 11 shown in FIG. 2.

In FIG. 5, communication channel C1 with the upstream-link access network 15 and communication channel C2 with the downstream-link access network 19 are dropped by dropper/inserter 36 based on signals received from digital trunk interface 39, which is the interface with line 13.

LAP V5 (37) terminates V5 protocol for upstream-link access network 15 and LAP V5 (38) terminates V5 protocol for downstream-link access network 19 and CPU 35 analyzes V5 protocol. In addition, in local exchange 11, subscriber 20 accommodated in downstream access network 19 is connected to the network by controlling time switch 34.

When outputting downstream instructions, CPU 35 produces a V5 message, LAP V5 (37 and 38) format the message to V5 protocol, and dropper/inserter 36 inserts the message to fixed channels C1 and C2 of line signal and transmits the message.

Explanation is next presented regarding the operation of this embodiment of the present invention with reference to the accompanying figures. The multiple connection system for a subscriber access network is explained below using the V5 interface shown in FIG. 2.

Explanation is first presented regarding channel assignment on line 13 between local exchange 11 and upstream access network 15.

Local exchange 11 and access network 15 shown in FIG. 2 are connected by line 13, and channel assignment on line 13 is carried out by a normal V5 interface. This channel assignment is carried out by communication between LAP V5 (37) on the side of local exchange 11 shown in FIG. 5 and LAP V5 (30) on the side of upstream-link access network 15 shown in FIG. 4. Channels on employed line 13 are assigned to channels determined in advance in accordance with the V5 interface. Channel numbers of line 17 are assigned to L3 addresses, which are constituents of V5 protocol messages that are transmitted and received using these channels. CPU 32 analyzes these messages and connects channels with line 13 and line 17 by time switch 31.

On the side of local exchange 11 as well, CPU 35 similarly analyzes V5 messages and connects channels on line 13 with network 15 by means of time switch 34. Channel assignment on line 13 is carried out by this processing for each call.

Explanation is next presented regarding channel assignment on line 17 between upstream-link access network 15 and downstream-link access network 19.

The V5 interface on line 17 establishes communication according to V5 protocol by means of LAP V5 (23) of downstream access network 19 and LAP V5 (38) of local exchange 11. This V5 protocol communication transmits as far as upstream-link access network 15 using one B-channel on line 13. This B-channel is assigned by the instructions of local exchange 11 (by means of BCC protocol) when a downstream-link access network 19 connects to upstream-link access network 15, and this channel is subsequently fixed and maintained. The assignment process on the side of local exchange 11 is the same as the channel assignment method on line 13 described hereinabove.

Upstream-link access network 15 carries out a process by which this communication channel is connected to a channel prescribed by the V5 interface on line 17 by means of time switch 31. By this connection process, V5 protocol on line 17 can be carried out without terminating at upstream-link access network 15, and channel can be assigned dynamically on the line 17 side as well in accordance with the V5 interface. Connection without the need for performing another local exchange functions or channel control in upstream-link access network 15 thus enables lower costs, a simplification of the connection process for calls, as well as conversion to an open interface through realization of a V5 interface.

Explanation is next presented with reference to the figures regarding multiple connection in this embodiment.

The operation to assign a V5 protocol communication channel with access network 19 begins at CPU 35 of local exchange 11 when access network 19 operated by another network service provider is to be connected to local exchange 11. The establishment of a V5 interface between local exchange 11 and upstream-link access network 15 is carried out in accordance with a normal V5 interface. CPU 35 produces BCC (Bearer Channel Connection) protocol, which is V5 protocol, and sends to LAP V5 (37). LAP V5 (37) produces layer 2 format of V5 protocol, inserts it to communication channel C1 with upstream-link access network 15 by means of dropper/inserter 36, and sends the V5 protocol message to upstream-link access network 15 by way of line 13. This BCC protocol is a protocol for channel assignment and places the channel number of communication channel C2 of line 17 in the L3 address contained in a message.

Upstream-link access network 15 drops communication channel C1 by means of dropper/inserter 29 and terminates by means of LAP V5 (30). CPU 32 analyzes this BCC protocol message and obtains: the information that it is a channel connection command; that the object of connection is communication channel C2 on line 17 that is noted in the L3 address; the link number of line 13 that is noted in the link ID, which similarly is information of the BBC protocol message; and the channel number on line 13 that is noted in the time slot number; and issues a command to time switch 31 such that connection is made. In this way, a communication channel is established between local exchange 11 and downstream-link access network 19. Subsequent communication between local exchange 11 and downstream-link access network 19 is as stipulated by the V5 interface.

Control of two access networks, i.e., an upstream-link and downstream-link access network, is thus made possible at one local exchange.

While preferred embodiments of the present invention have been described using specific terms, such description is for illustrative purposes only, and it is to be understood that changes and variations may be made without departing from the spirit or scope of the following claims.

What is claimed is:

1. A multiple connection method for a subscriber access network in a switched system, comprising the steps of:

connecting a subscriber to an access network;

accommodating an interface between the access network and carrier switch;

terminating a local exchange function to an access network operated by a service provider of the local exchange by means of the said interface when connecting an access network that accommodates a second subscriber of second network service provider to the access network operated by the service provider of the local exchange; and effecting a control of multiple connection of subscriber access network by means of the said interface by using one B-channel as communication channel C2 with said access network accommodating said second subscriber of said second network service provider apart from communication channel C1 prescribed by a normal protocol between the local exchange and the access network operated by the service provider of the local exchange.

2. A multiple connection device for a subscriber access network that connects a downstream-link access network that accommodates subscribers of another network service provider to an upstream-link access network operated by the service provider of a local exchange, wherein:

the local exchange includes: a time switch for concentrating subsidiary lines; LAP (Link Access Procedure) for terminating communication channels prescribed by a protocol that connected with upstream-link access network accommodated at lower ranks; another LAP that is provided for terminating communication channels prescribed by said protocol that connected with downstream-link access networks of another network service providers located at still lower ranks; a dropper/inserter that drops a control channel of said protocol to at least one of said LAP and said another LAP or inserts a message from at least one of LAP and said another said LAP to an appropriate channel; and a CPU that controls said protocol, channel assignment on lines, and concentration;

the upstream-link access network includes: a time switch that connects channels of lines with said local exchange to channels of lines with lower-ranking access networks; a dropper/inserter that drops or inserts said protocol communication messages with the local exchange; LAP, which is a protocol terminating device; and a CPU that directs connections of the protocol, higher-ranking, and lower-ranking channels; and the downstream-link access network includes: a dropper/inserter that drops or inserts communication messages prescribed by the protocol with said local exchange; a time switch that switches connections between line channels and accommodated subscribers; a subscriber circuit having an interface function with accommodated subscribers; LAP, which is a protocol terminating device; and a CPU that controls said protocol and administers connections between line channels and subscribers.

3. A multiple connection device for a subscriber access network according to claim 2 that controls multiple connection of subscriber access network by means of interfaces between the access network and the carrier switch by using one B-channel as communication channel C2 with access networks accommodating subscribers of another network service providers apart from communication channel C1 prescribed by normal protocol between the local exchange and the access network operated by the service provider of the local exchange.

4. A multiple connection device for a subscriber access network that, in a switched system that accommodates an interfaces prescribed by a protocol specifying interface between the access network and the carrier switch, connects a downstream-link access network that accommodates subscribers of another network service provider to an upstream-link access network operated by the service provider of a local exchange, wherein:

the local exchange includes: a time switch for concentrating subsidiary lines: LAP (Link Access Procedure) protocol for terminating communication channels prescribed by said protocol that connect with upstream-link access networks accommodated at lower ranks; another LAP that is provided apart from said LAP for terminating communication channels prescribed by said protocol that connect with downstream-link access networks of another network service providers located at still lower ranks; a digital trunk interface having the role of interfacing with a line; a dropper/inserter that drops a control channel of said protocol to at least one of said LAP and said another LAP or inserts a massage from at least one of said LAP and said another LAP to an appropriate channel; and a CPU that controls said protocol, channel assignment on lines, and line concentration;

the upstream-link access network includes: a time switch: connects channels of lines with said local exchange to channels of lines with lower-ranking access networks; a digital trunk interface that serves as interface with lines; a dropper/inserter that drops or inserts said protocol communication messages with the local exchange; LAP, which is protocol terminating device; and a CPU that directs connections of said protocol, higher-ranking, and lower-ranking channels; and the downstream-link access network includes: a digital truck interface that serves as interface with lines; a dropper/inserter that drops or inserts protocol communication messages with said local exchange; a time switch that switches connections between line channels and accommodated subscribers; a subscriber circuit having an interface function with accommodated subscribers; subscriber circuit interface that serves as an interface between said subscriber circuit and said time switch; LAP, which is a protocol terminating device, and a CPU that controls said protocol and administers connections between line channels and subscribers.

5. A multiple connection device for a subscriber access network according to claim 4 that controls multiple connection of subscriber access network by means of interfaces by using one B-channel as communication channel C2 with access networks accommodating subscribers of another network service providers apart from communication channel C1 prescribed by normal protocol between the local exchange and the access network operated by the service provider of the local exchange.

* * * * *